United States Patent [19]

Sato et al.

[11] Patent Number: 5,133,071
[45] Date of Patent: Jul. 21, 1992

[54] CHANNEL CONTROL METHOD AND APPARATUS

[75] Inventors: Tadashi Sato; Masahiro Yamashita; Shigeru Yamamoto, all of Hadano; Akio Sasaki, Odawara, all of Japan

[73] Assignee: Hitachi, Ltd., Tokyo, Japan

[21] Appl. No.: 274,322

[22] Filed: Nov. 21, 1988

[30] Foreign Application Priority Data

Nov. 25, 1987 [JP] Japan .................. 62-296642

[51] Int. Cl.⁵ .................. G06F 13/12; G06F 9/22
[52] U.S. Cl. .................. 395/700; 395/275; 364/DIG. 1; 364/280; 364/280.2; 364/238.3; 364/262.8; 364/262.4
[58] Field of Search .......... 364/926.93; 395/275 MS, 395/575 MS, 700 MS, 325 MS, 375 MS

[56] References Cited

U.S. PATENT DOCUMENTS

| | | | |
|---|---|---|---|
| 4,268,902 | 5/1981 | Bergland et al. | 364/200 |
| 4,280,176 | 7/1981 | Tan | 364/200 |
| 4,325,119 | 4/1982 | Grandmaison et al. | 364/200 |
| 4,348,725 | 9/1982 | Farrell et al. | 364/300 |
| 4,484,263 | 11/1984 | Olson et al. | 364/200 |
| 4,682,328 | 7/1987 | Ramsay et al. | 371/13 |
| 4,751,634 | 1/1988 | Burrus, Jr. et al. | 364/200 |
| 4,841,475 | 6/1989 | Ishizuka | 364/900 |
| 4,878,166 | 10/1989 | Johnson et al. | 364/200 |
| 4,882,672 | 11/1989 | Yahiro | 364/200 |
| 4,882,702 | 11/1989 | Struger et al. | 364/900 |

Primary Examiner—Kevin A. Kriess
Attorney, Agent, or Firm—Fay, Sharpe, Beall, Fagan, Minnich & McKee

[57] ABSTRACT

In a channel control for an information processing system, a service processor (SVP) loads a microprogram of the channel controller at system initialization, and thereafter initiates the microprogram for storing microprograms and configuration information for a plurality of channel units held in the SVP into the specified area of a main storage. Subsequently, the configuration information and microprograms from the main storage are loaded into the channel units under control of the microprogram of the channel controller. Thereby, the microprograms and configuration information are loaded into the channel units by a channel controller equipped with a fast-processing microprocessor and, eventually, a fast loading control and error correction process are accomplished.

9 Claims, 4 Drawing Sheets

5,133,071

CHANNEL CONTROL METHOD AND APPARATUS

BACKGROUND OF THE INVENTION

The present invention relates to a control method and apparatus for an information processing system, and more particularly to a method and apparatus for loading microprograms intended for a processing system which adopts the microprogram-based channel control.

This kind of technique is described, for example, in JP-A-59-103151. As described in the above publication, when computer systems grow in scale and the number of channels in connection increases, the internal logical control tends to become more intricate, and the channel control system based on microprogram is employed with the intention of alleviating the complexity. Such a system is operated such that control microprograms are stored in advance in an external secondary storage medium (e.g., floppy disk), the microprograms in the secondary storage medium are loaded into a control storage (referred to simply as CS) under control of a service processor (simply SVP) when the computer is turned on, and once started the microprograms in the control storage are executed sequentially to control channel units.

The above-cited prior art system is designed to speed up the loading by loading microprograms for a plurality of channels simultaneously. However in that system, loading of microprograms into the CS is controlled by the SVP, which is constituted by a general-purpose processor operating at a relatively low processing speed, and therefore even using the above-mentioned technique it takes a lot of loading time, and it is difficult to perform the high-speed channel control.

Moreover, the above-referenced prior art has no consideration for the event of error detection in a microprogram which has been loaded into the CS. In such a case, the slow processing SVP controls to correct the microprogram by rewriting, resulting in a retarded return to the normal processing routine.

SUMMARY OF THE INVENTION

An object of the present invention is to provide a channel control method and apparatus which speed up the loading control and error correction for microprograms without the need of significant alteration of the hardware.

In order to achieve the above object, according to one feature of the present invention, the SVP loads a microprogram of the channel controller at initialization of the information processing system, and thereafter initiates the microprogram for storing microprograms and configuration information indicative of the type and number of channels of a plurality of channel units held in the SVP into a specified area of a main storage (MS), and subsequently the configuration information and microprograms are loaded into the channel units under control of the microprogram of the channel controller.

According to the above operational procedure, once the microprogram is loaded and initiated for the CS of channel controller by the SVP, the channel controller equipped with a microprocessor capable of fast processing for each channel unit implements the loading of microprograms and configuration information without the intervention of the slow processing SVP. Accordingly, it becomes possible that the loading control and error correction, which have been implemented by the SVP conventionally, are now processed very fast by the channel controller and main storage.

DESCRIPTION OF THE PREFERRED EMBODIMENT

An embodiment of the present invention will be described in detail with reference to the drawings.

Figure 1:
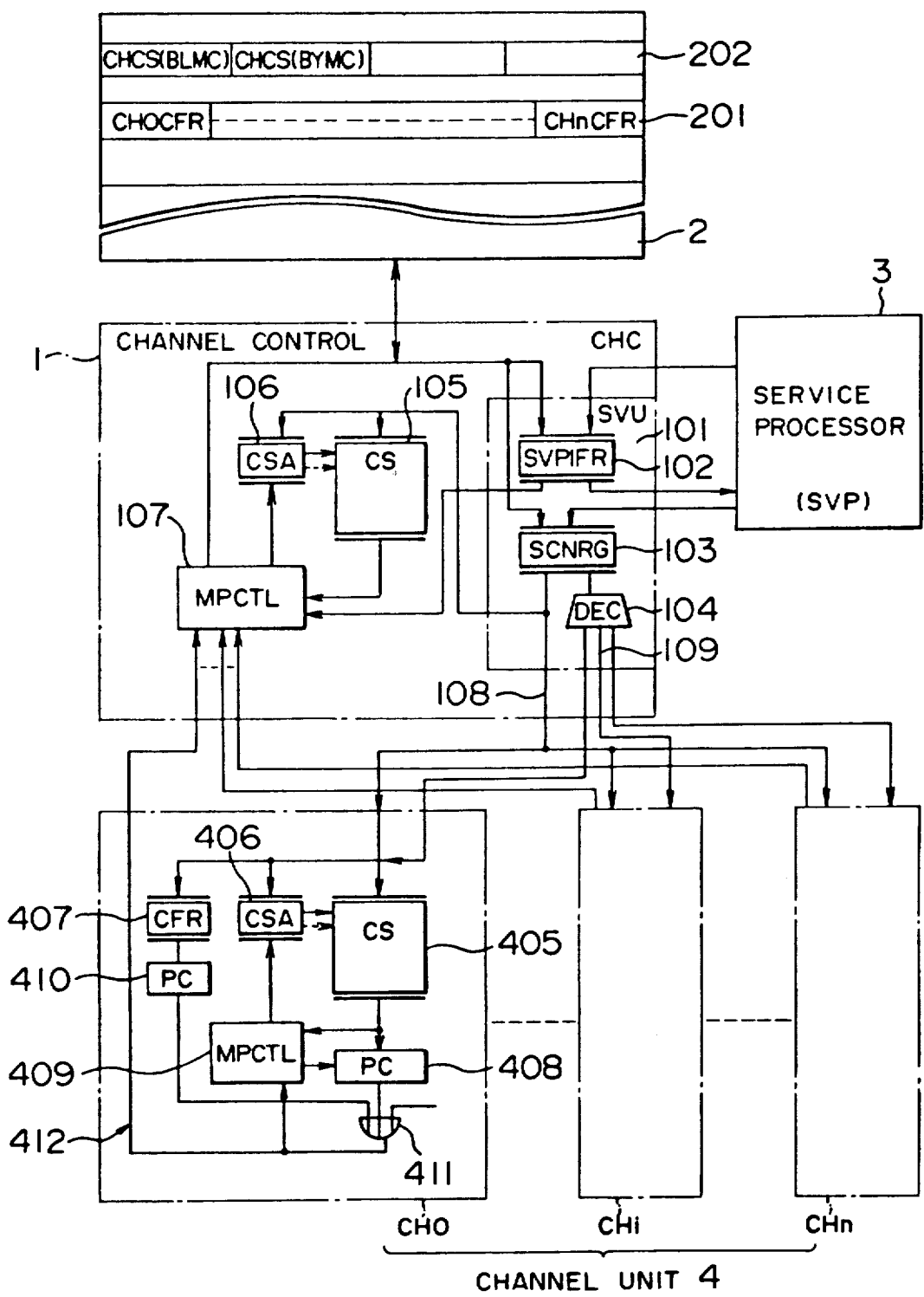
FIG. 1 is a block diagram showing part of the microprogram control logic circuit of the processor according to an embodiment of the present invention.

In FIG. 1 showing a system configuration for channel control, indicated by 1 is a channel controller (CHC), 2 is a main storage (MS), 3 is a service processor (SVP), and 4 are channel units (CH0-CHn). The CHC 1 includes a SVP unit (SVU) 101 for controlling the interface with the SVP 3, and the SVU 101 is made up of a register (SVPIFR) 102 used for the interface between the CHC 1 and SVP 3, a scan register (SCNRG) 103 for controlling the scan path 108 and selection signal 109, and a decoder (DEC) 104 for distributing the select signals 109 to the channel units CH0-CHn. The SVP 3 issues monitoring/control commands to the SCNRG 103. The scanned path includes a common data path, address path and timing control path.

The CHC 1 further includes a control storage (CS) 105 for storing microprograms, an address register (CSA) 106 for addressing the CS 105, and a microprogram controller (MPCTL) 107 which controls the execution of microprograms. The control storage (CS) 105 has a capacity of about 100 KB, in which an area of about 10 KB is alloted to the loading area for microprograms transferred from the SVP 3. The MPCTL 107 is a dedicated high-speed controller configured in a wired-logic LSI.

The arrangement of channel units 4 will be explained by taking an example of CH0. Indicated by 405 is a control storage (CS) having a capacity of 2 KB for example, and it stores a microprogram which serves as a sequencer of input/output interface for the channel unit (CH0 in this case). Indicated by 406 is an address register (CSA) for addressing the CS 405, 408 is a check circuit (PC) for verifying the content read out of the CS 405, 409 is an execution controller (MPCTL) for the channel unit (CH0 in this case), 407 is a configuration control register (CFR), and 410 is a check circuit (PC) for verifying output information from the configuration control register (CFR) 407. The check circuits (PC) 408 and 410 have their outputs sent by way of an OR gate 411 to the MPCTL 107 of CHC 1. Other channel units CHi and CHn have the same arrangement as that of CH0 described above, and it may be a known one except for the method of microprogram loading. Although only three channel units CH0, CHi and CHn are shown in the figure for the expedient of explanation, a large-scale information processing system has a connection of more, e.g., 16 or 32, channel units in general. This embodiment is assumed that the CH0 and CHi function as block multiplexer channels (BLMC), while the CHn functions as a byte multiplexer channel (BYMC).

In the embodiment, the main storage (MS) 2 has in its system area an area 201 for storing configuration information (CHOCFR-CHnCFR) for each channel unit and an area 202 for storing information (CHCS) of CS 405 for each channel unit. These areas 201 and 202 have the contents similar to those of CS 105 of CHC 1 and of CFR 407 and CS 405 of each channel unit 4. The information prepared in a secondary storage medium such as a floppy disk as shown by 306 in FIG. 2 is loaded into the main storage (MS) 2 under control of the SVP 3 at the time of system start-up.

Figure 2:
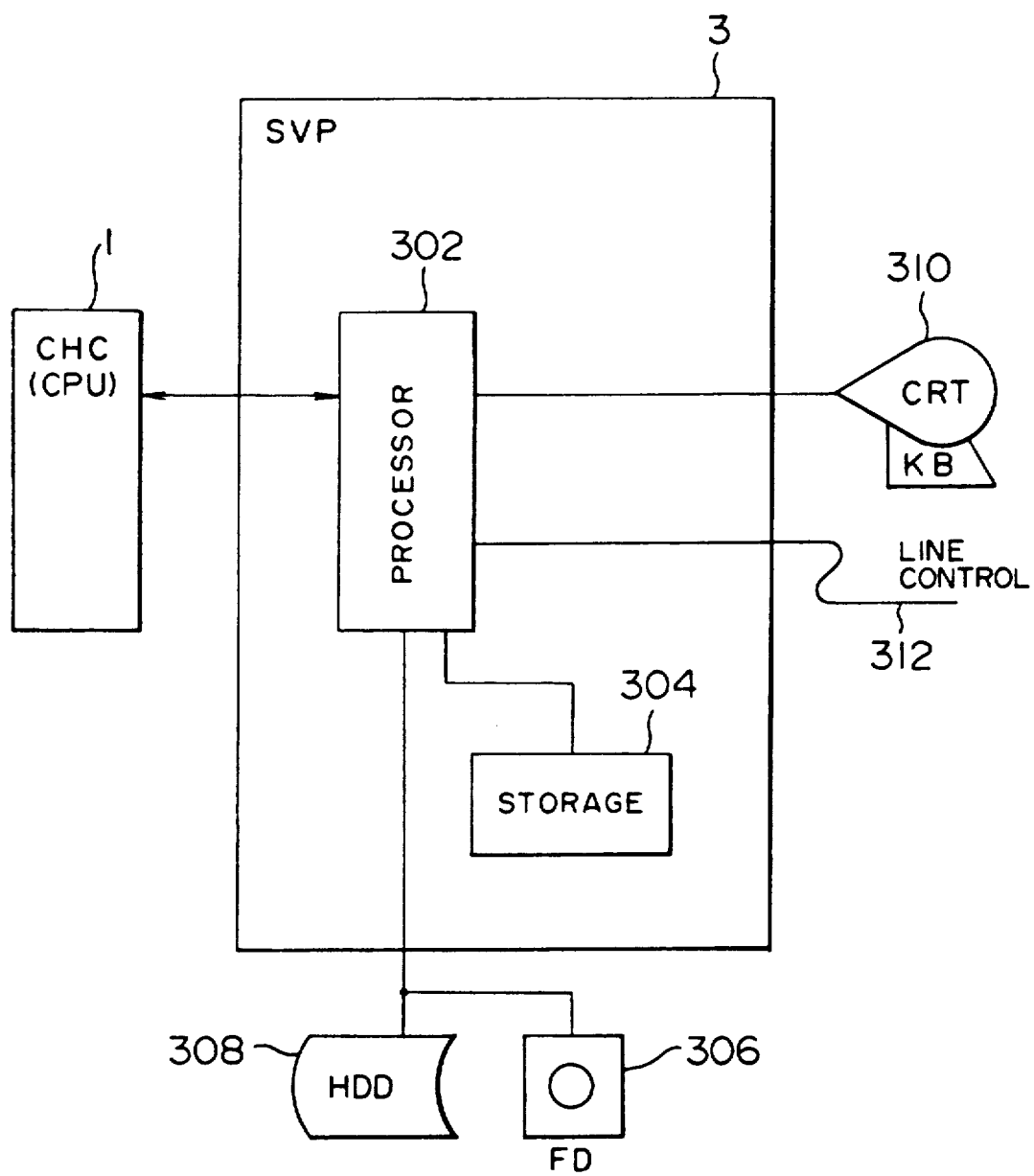
FIG. 2 is a block diagram showing the arrangement of the SVP in FIG. 1.

The service processor SVP 3 generally incorporates a general-purpose processor 302, e.g., Motorola type M68000 and a memory 304, and the processor 302 is connected with a floppy disk unit (FD) 306 containing channel loading microprograms, a hard disk unit (HDD) 308, a display/keyboard 310, and a line control path 312, as shown in FIG. 2. The SVP 3 includes functions of console control, line control, power control and system operation support.

Figure 3:
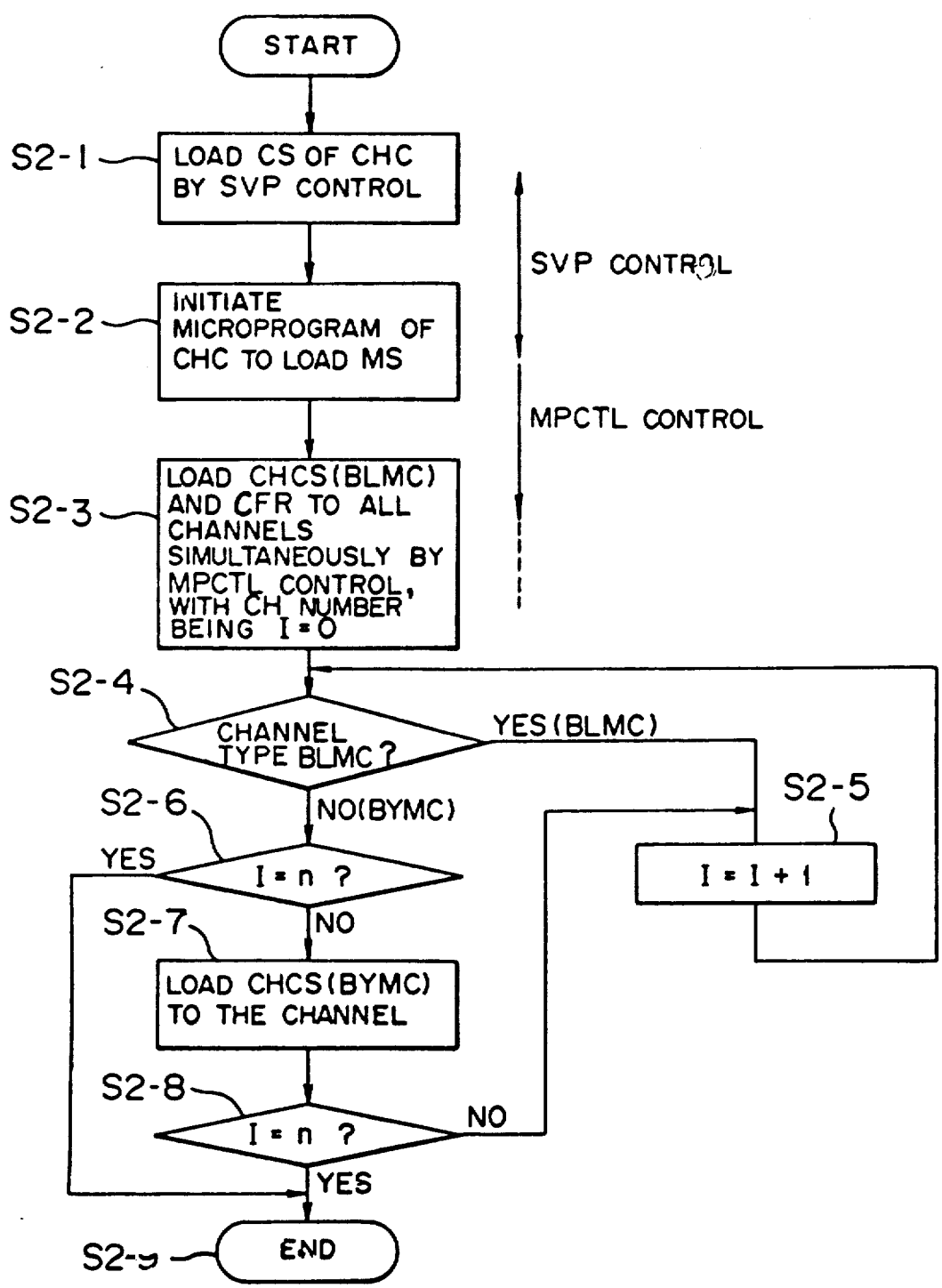
FIG. 3 is a flowchart showing the procedure of initial loading in FIG. 1.

The operation of the foregoing system will be described in connection with FIGS. 1 and 3. At the startup of channel units, i.e., at system initialization, the SVP 3 operates on the SCNRG 103 of CHC 1 to set the address in the CSA 106. Subsequently, the SVP 3 loads microprograms sequentially in correspondence to the addresses: (S2-1).

Next, the SVP 3 activates the MPCTL 107 through the SVPIFR 102, and operates in unison with the MPCTL 107 to load the CS information (CHCS, i.e. BLMC or BYMC) for each channel type held by SVP 3 and configuration information (CHOCRF-CHnCFR) of each channel unit into the specified areas 201 and 202 of MS 2: (S2-2).

When the SVP 3 prompts the CHC 1 to load microprograms and configuration information (CFR) to each channel, the microprogram of block multiplexer channel (BLMC) which is the basic channel type is read out of the area 202 of MS 2 under control of the MPCTL 107 of CHC 1, and at the same time the SCNRG 103 is controlled so that the address is written in the CSA 406 of channel unit CHO by way of the select signal 109 and scan path 108. Writing of an address takes place for all channel units CHO-CHn at once. This is based on the fact that the BLMC is in a majority of the channel type and only channel units of different types are rewritten to achieve higher process efficiency.

Subsequently, the microprograms corresponding to the written addresses are loaded into the CS 405 of each channel under control of the MPCTL 107. At the same time, the configuration information (CFR) of each channel unit written in the MS 2 is loaded into the CFR 407 of each channel unit (CHO-CHn) under control of the MPCTL 107: (S2-3). At this time, the channel type of all channel units (CHO-CHn) is assumed to be the basic block multiplexer channel for the same reason as mentioned above, and all channel units are loaded in this type simultaneously.

Subsequently, the area 201 is referenced by being incremented by one sequentially under control of the MPCTL 107: (S2-5), and it is examined whether there exists a channel type other than the block multiplexer channel, (S2-4). Upon detecting that all the channel types are of the block multiplexer channel: (S2-6), the process terminates.

If another channel type, e.g., byte multiplexer channel, (CHnCFR in FIG. 1) is detected, the MPCTL 107 controls to load the microprogram (CHCS(BYMC)) for the byte multiplexer channel stored in the area 202 of MS 2 into the CS 405 (not shown) of the pertinent channel unit (CHn in this case), and subsequently the contents of CHnCFR stored in the area 201 is loaded into the CFR 407 (not shown) of CHn: (S2-7). Naturally, this loading takes place separately only for the CFR 407 of pertinent channel CHn apart from the CHO and CHi of distinct block multiplexer channel. In case the content of loading to CHCS (BYMC) is virtually the same as the already loaded content of CHCS (BLMC), only a differential portion may be loaded so as to speed up loading. After the contents of the area 201 have been referenced sequentially: (S2-8), the process terminates.

In this embodiment, as described, after the SVP 3 has directed the CHC 1 to load the microprogram at system initialization, the MPCTL 107 in CHC 1 mainly takes control for the process. Owing to the dedicated processor which is faster than the SVP 3 using a general-purpose processor in general, the MPCTL 107 of CHC 1 implements high-speed loading of microprograms for the channel units (CHO-CHn).

Figure 4:
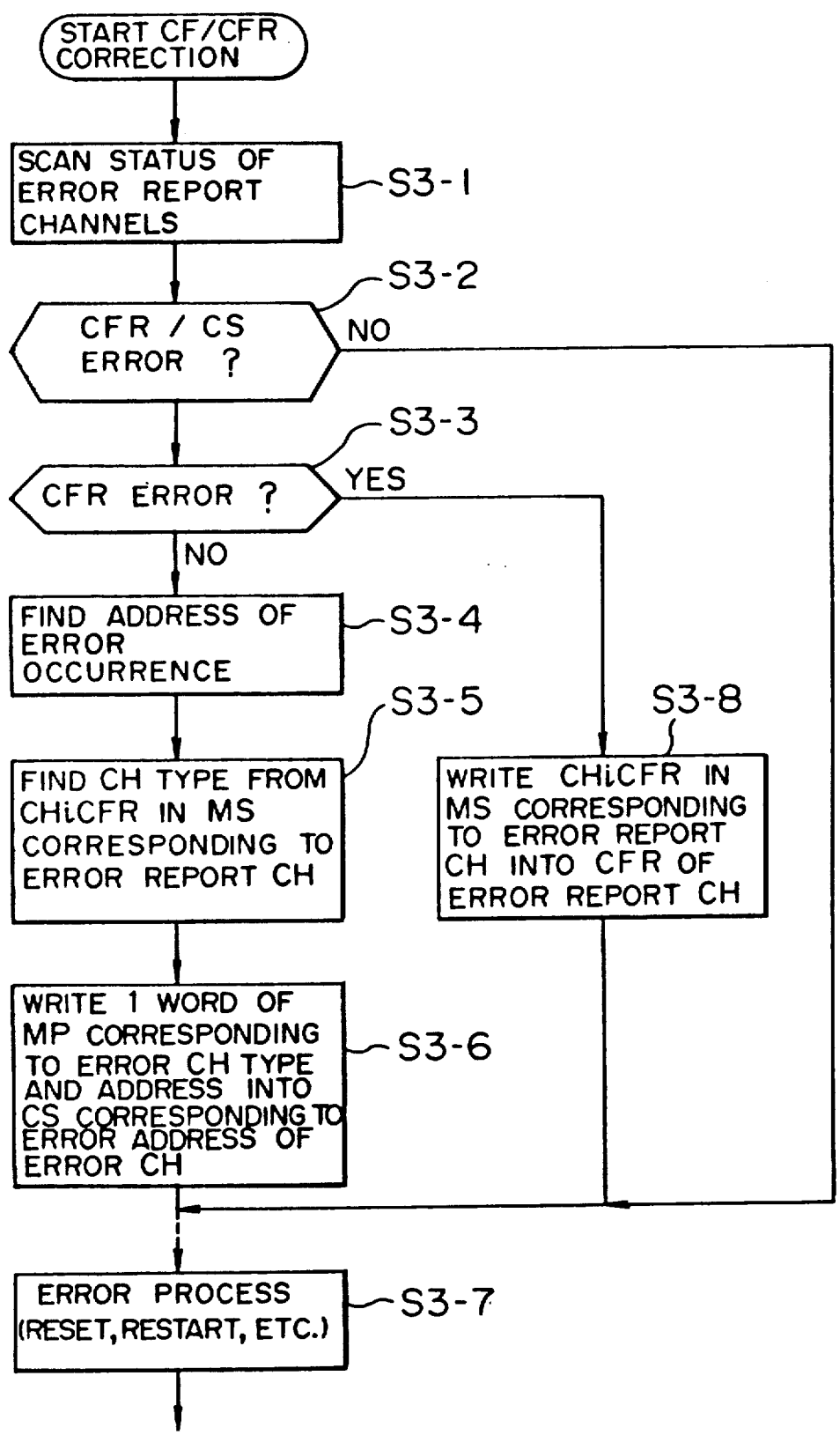
FIG. 4 is a flowchart showing the procedure of error correction.

Next, the process at the occurrence of CS error or CFR error during the system operation will be described on the flowchart of FIG. 4 by taking an example for CHO. The CHO implements the checking, e.g., parity check, of data read out of the CS 405 using the check circuit (PC) 408 and checks for the CFR 407 using the check circuit (PC) 410. In the event of error detection by the check circuit 408 or 410, which outputs are logical-summed by the OR gate 411, an error detect signal 412 is issued to the MPCTL 107 of CHC 1. At the same time, in response to the entry of the error detect signal 412, the MPCTL 409 of CHO halts the processing of the channel CHO, with the address being held. Next, the microprogram 105 controls to monitor the state of the channel (CHO in this case) by way of the SCNRG 103, select signal 109 and scan path 108: (S3-1), and determines the cause of error to be either the CFR 407 or CS 405.

If a CS error is detected: (S3-3), and the type of the program is searched to find the address where the error occurred; (S3-4), and the type in which the error occurred is determined channel (CHO), i.e., it is determined that the channel is a block multiplexer channel or a byte multiplexer channel, is examined: (S3-5). Next, the microprogram of the error-causing channel type reads out one word of microprogram corresponding to the error address from the CHCS 202 of MS 2 under control of the MPCTL 107. The microprogram further sets the address to the CSA 406 of the error channel (CHO) and writes the one word of microprogram into the CS 405: (S3-6). In this way, the erroneous portion of the contents of CS 405 is corrected, and the MPCTL 107 issues a reset or restart command so that the normal processing routine is resumed: (S3-7).

In case of the detection of read error in the CFR 407 by the check circuit (PC) 410: (S3-8), the MPCTL 107 controls to read out the CHnCFR 201 from the MS 2 and re-load it into the error-causing CFR 407 in the same manner as described above, and the error is corrected: (S-8).

The advantages resulting from this embodiment of invention are as follows.

(1) At system initialization, after the SVP 3 has directed the CHC 1 to load microprograms, the MPCTL 107 in the CHC 1 mainly takes control of microprogram loading to channel units. The MPCTL 107 of CHC 1 bases the process control on its dedicated processor which is faster, e.g., 40 ns per basic cycle, than the SVP 3 using a general-purpose processor, e.g., 400 ns per basic cycle, and this enables faster microprogram loading to all channel units (CH0-CHn).

(2) In loading microprograms and configuration information into channel units, all channel units (CH0-CHn) are addressed simultaneously through the scan path 108, and this further reduces the loading time.

(3) In the event of readout error in a channel unit, the configuration information or microprogram stored in a certain area accessible by the hardware designer is reloaded into the channel unit under control of the MPCTL 107 in CHC 1, and this enables prompt error recovery.

What is claimed is:

1. A channel control system for an information processing system which includes a plurality of channel units each including a configuration register for storing channel configuration information and a control storage for storing channel control microprograms, a channel controller for controlling reading and writing of said channel units, a main storage, and a service processor operable to load microprograms held by said service processor into said channel controller at system initialization, said channel controller comprising:

first means for writing at system initialization a loading control microprogram for controlling loading of additional microprograms, including channel control microprograms, and channel configuration information from said service processor into said channel controller;

second means for initiating the loading control microprogram written in said channel controller from said service processor to write the channel configuration information and the channel control microprograms held in said service processor into a specified area of said main storage; and third means for writing information written in said specified area of the main storage into at least one of said configuration registers and control storages of said channel units under control of said loading control microprograms written in said channel controller.

2. The channel control system according to claim 1, wherein said channel controller comprises scan path means for connecting a common data path, address path and timing control path to said channel units;

and wherein said service processor, which at system initialization, loads the loading control microprogram of said channel controller therein, and thereafter writes the microprograms and configuration information of said channel units into the specified area of the main storage under control of the loading control microprogram of said channel controller;

said channel controller being arranged to simultaneously load the channel configuration information and the channel control microprograms corresponding to a basis channel type of channel unit from said main storage into said channel units through said scan path under control of the loading control microprogram of said channel controller, and said channel controller separately reloads the channel configuration information or the channel control microprograms from said main storage only for a channel unit of a different channel type.

3. The channel control system according to claim 1, wherein each of said channel units comprises means for detecting an error in the channel control microprograms and the channel configuration information of said channel unit during system operation; means for holding the address accessed at the time of error detection; and means responsive to entry of error detect information for initiating the loading control microprogram of said channel controller so as to determine the cause of the error and correct the contents of the configuration register or the control storage of said channel unit in which said error has been detected by reading out the channel configuration information and the channel control microprogram of said channel unit from said main storage.

4. The channel control system according to claim 1, wherein said channel controller comprises a storage means for storing the loading control microprogram which controls the loading of said microprograms including said channel control microprograms, and a microprogram controller for controlling the execution of said second means and third means by executing said loading control microprogram.

5. A channel control method for an information processing system which includes a plurality of channel units each having a configuration register for storing channel configuration information and a control storage for storing channel control microprograms, a channel controller for controlling reading and writing of said channel units, a main storage, and a service processor which loads a loading control microprogram held therein, to said channel controller at system initialization, said channel controller including means for storing the loading control microprogram from said service processor, means for writing channel configuration information and channel control microprograms held in said service processor into a specified area of said main storage in response to the initiation of the loading control microprogram of said channel controller provided by said service processor, and means for writing information from the specified area of said main storage into at least one of said configuration register and said control storage of each channel unit in accordance with said loading control microprogram, said method comprising:

a first step of loading, by said service processor at system initialization, the loading control microprogram of said channel controller into said storing means of said channel controller;

a second step of initiating, thereafter by said service processor, said loading control microprogram to load the channel control microprograms and configuration information of said channel units held in said service processor into the specified area of said main storage; and a third step of loading, under control of the loading control microprogram of said channel controller, the channel configuration information and channel control microprograms stored in the specified area of said main storage into the channel units.

6. The channel control method according to claim 5, wherein said third step includes a step of simultaneously loading, under control of the loading control microprogram of said channel controller, the channel configuration information and channel control microprograms corresponding to a basic channel types of said channel units into said channel units, and separately reloading corresponding channel configuration information or channel control microprograms for a channel unit of a different channel type.

7. The channel control method according to claim 5, further including:

- detecting an error in the channel control microprogram and channel configuration information of one of the channel units during system operation;
- holding an address of one of the channel configuration information and the channel control microprogram at the time of error detection; and
- responding to entry of error detect information for initiating the loading control microprogram of the channel controller so as to determine the cause of error and correct the contents of the configuration register or control storage of the channel unit in which said error has been detected, by reading out the channel configuration information and the channel control microprogram of the channel unit from the main storage.

8. The channel control system according to claim 1, wherein said third means includes a high-speed microprocessor, which operates to transfer the channel control microprograms and channel characteristic information from main storage to the channel units.

9. The channel control method according to claim 5, wherein the third step of loading includes implementing a high-speed microprocessor to transfer the channel control microprograms and channel characteristic information from the main storage to the channel units.

* * * * *

UNITED STATES PATENT AND TRADEMARK OFFICE
CERTIFICATE OF CORRECTION

PATENT NO. : 5,133,071
DATED : July 21, 1992
INVENTOR(S) : Tadashi Sato, et al.

It is certified that error appears in the above-identified patent and that said Letters Patent is hereby corrected as shown below:

Claim 1, column 5, line 45, delete "microprograms" and replace with --microprogram--.

Claim 2, column 5, line 62, delete "basis" and replace with --basic--.

Claim 6, column 6, line 68, delete "types" and replace with --type--.

Signed and Sealed this

Twenty-eighth Day of September, 1993

Attest:

BRUCE LEHMAN

*Attesting Officer*        *Commissioner of Patents and Trademarks*